United States Patent [19]

Haire

[11] 4,275,501
[45] Jun. 30, 1981

[54] LAMINATE CUTTING ASSEMBLY

[75] Inventor: Darrell W. Haire, Eagle River, Ak.

[73] Assignees: Michael Herr, N.J.; Keith Johnson, Ak.

[21] Appl. No.: 104,015

[22] Filed: Dec. 17, 1979

[51] Int. Cl.³ .............................................. B27B 9/04
[52] U.S. Cl. ...................................... 30/374; 30/388; 30/392
[58] Field of Search ................. 30/374, 371, 388, 392, 30/DIG. 3; 83/743, 745, 574

[56] References Cited

U.S. PATENT DOCUMENTS

| | | | |
|---|---|---|---|
| 2,815,572 | 12/1957 | Diezken | 30/DIG. 3 X |
| 3,388,728 | 6/1968 | Riley, Jr. et al. | 30/392 |
| 3,839,789 | 10/1974 | Valkosky | 30/374 |
| 4,059,038 | 11/1977 | Rietema | 83/745 |
| 4,135,419 | 1/1979 | Chapin | 83/745 X |

Primary Examiner—Frank T. Yost
Attorney, Agent, or Firm—Connolly and Hutz

[57] ABSTRACT

A laminate cutting assembly includes spaced upper and lower plates whereby the laminate sheet may be inserted therebetween and cut by a cutter extending through aligned slots in the plates with a movable guide bar assembly having a guide surface in the space between the plates controlling the width of the cut.

24 Claims, 6 Drawing Figures

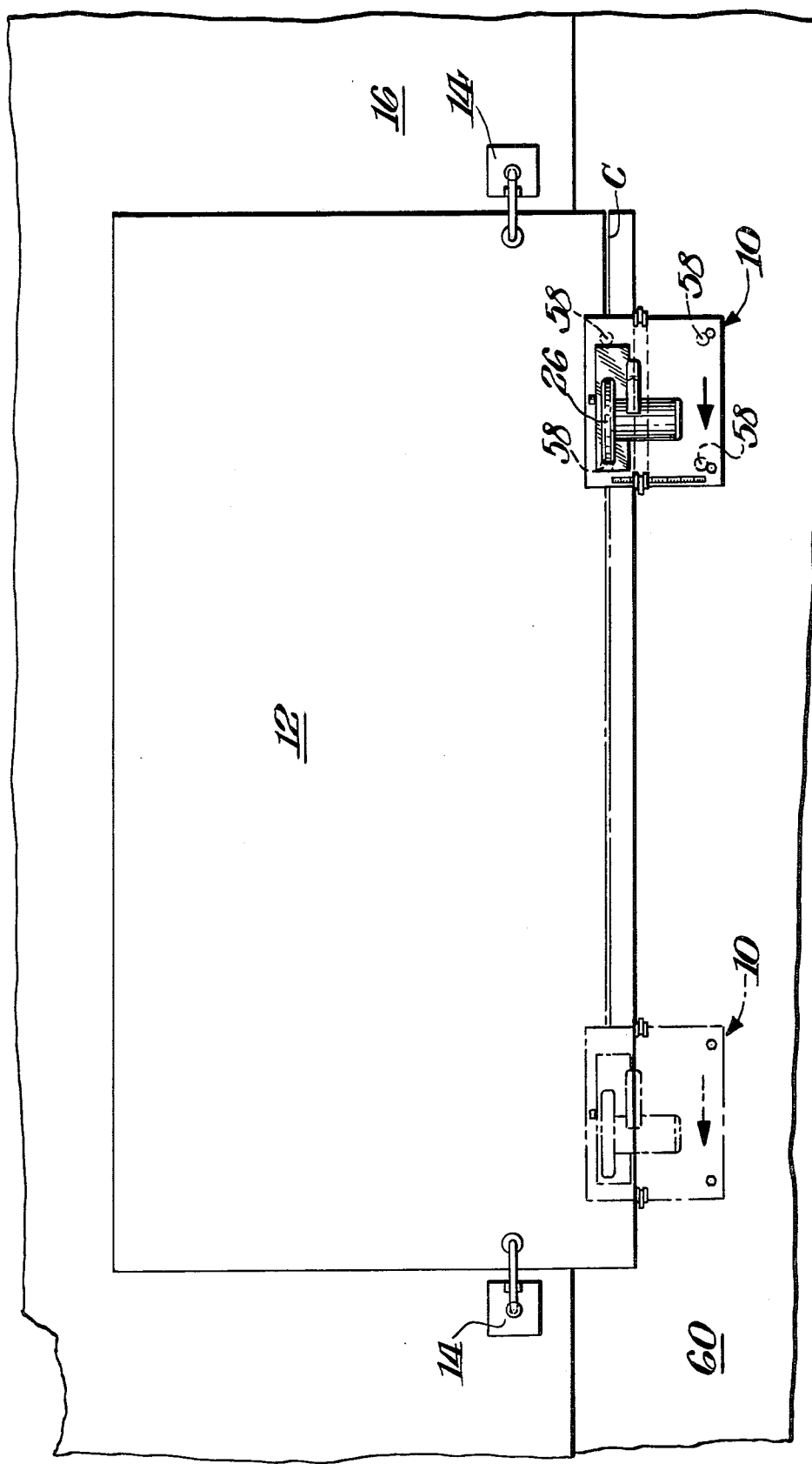

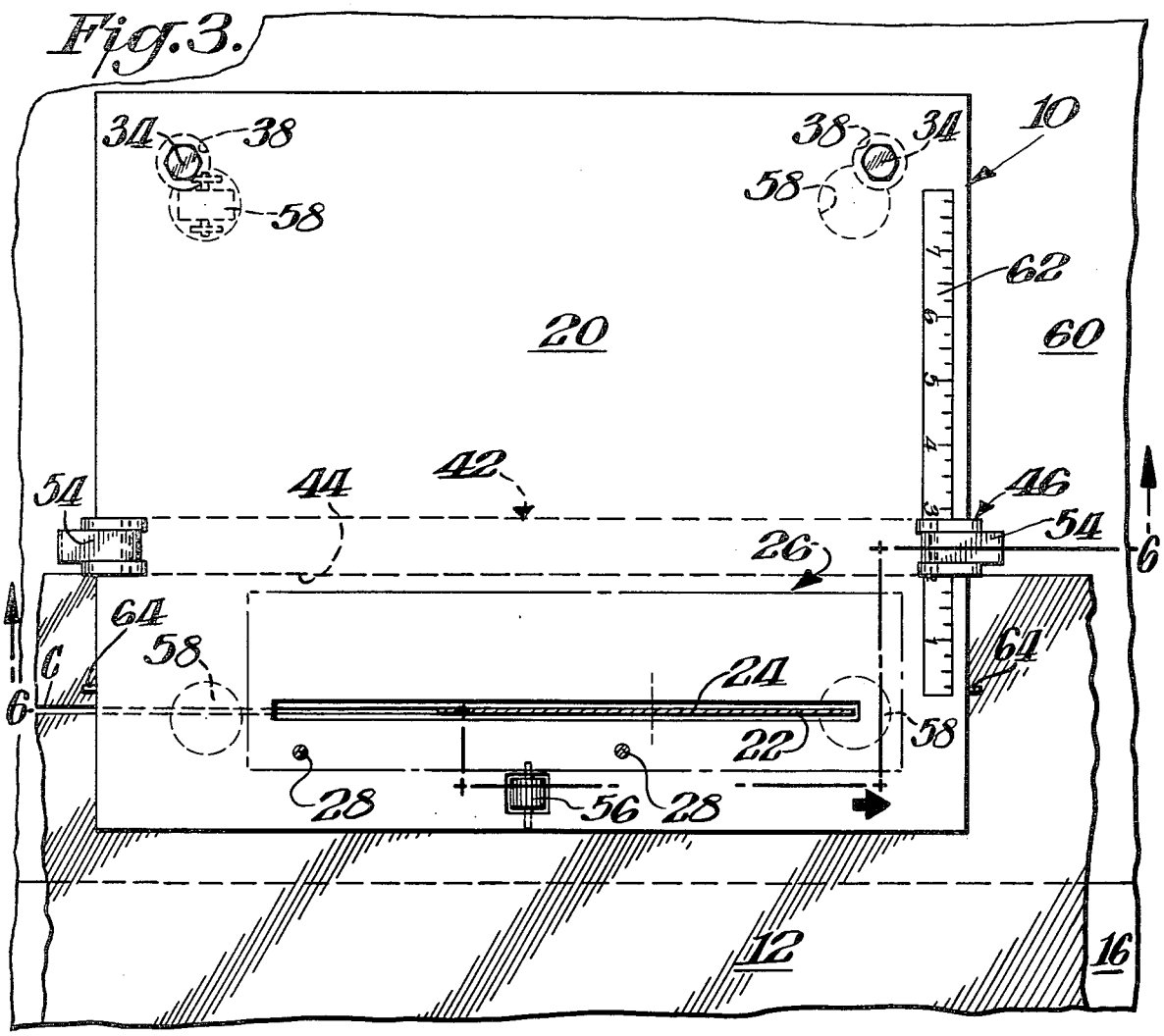
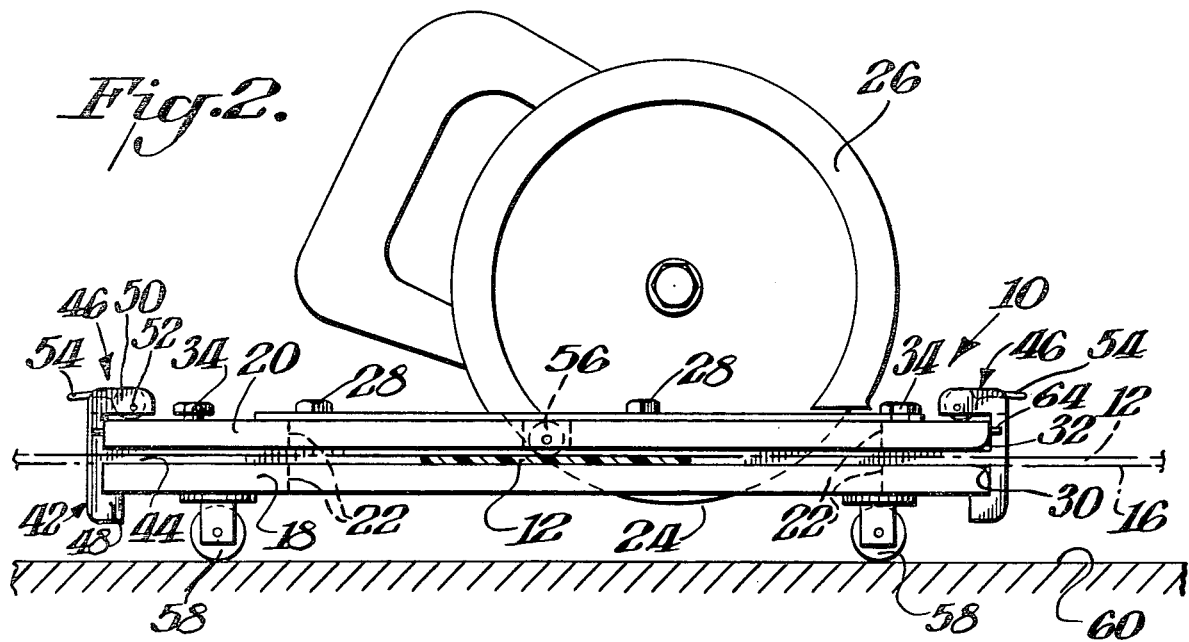

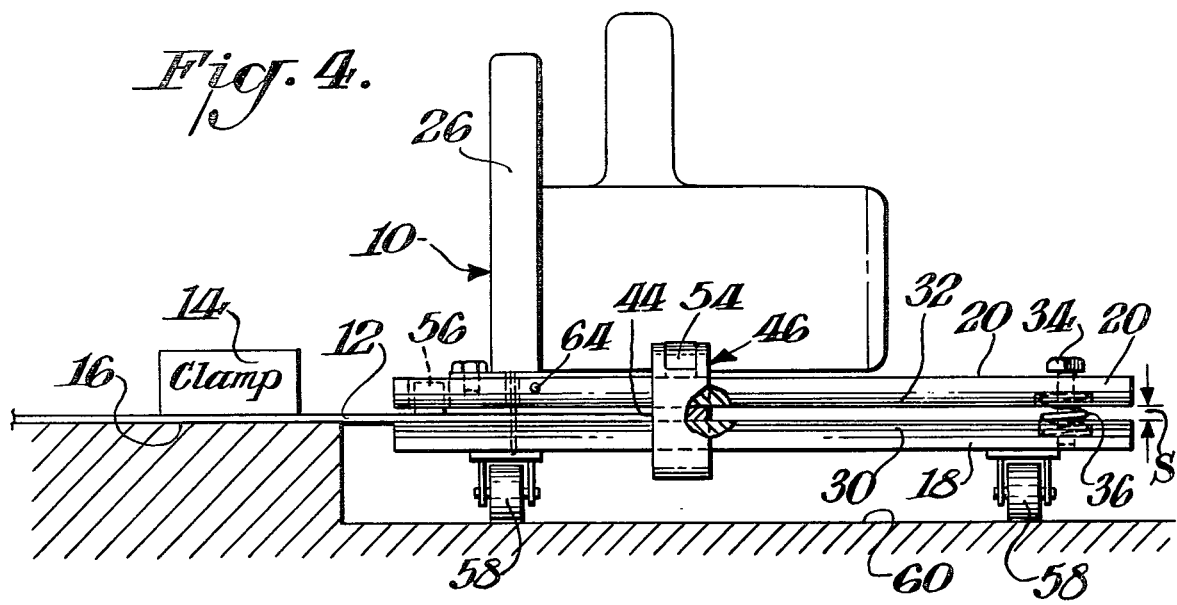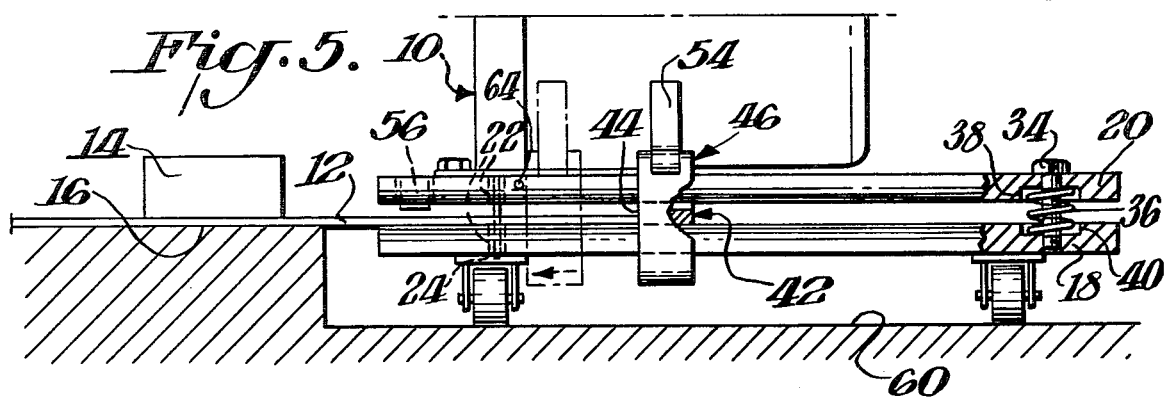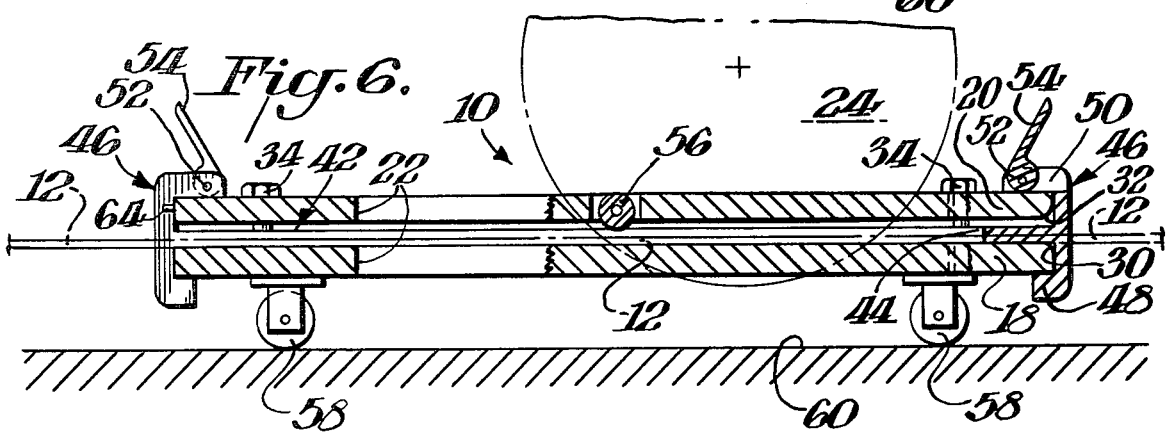

LAMINATE CUTTING ASSEMBLY

BACKGROUND OF THE INVENTION

The present invention is particularly directed to a device for use in cutting sheets of material such as laminates and more particularly for cutting splash and edging. It is particularly desirable when cutting such sheets that the cut be accomplished in a quick and convenient manner and also that the cut edge be smooth. Further it is essential that the width of the cut be uniform so that accurate dimensioning is achieved.

SUMMARY OF THE INVENTION

An object of this invention is to provide a laminate cutting assembly wherein sheets such as Formica or the like may be quickly and conveniently cut in a reliable manner.

A further object of this invention is to provide such an assembly which minimizes vibration of the sheet during the cutting operation so as to assure a smooth cut edge.

In accordance with this invention, the laminate cutting assembly includes spaced upper and lower plates whereby the sheet to be cut may be inserted therebetween. The cutter mounted on the upper plate extends through aligned slots in the plates for cutting the sheet upon relative movement between the assembly and the sheet. A guide bar assembly is provided with a guide surface located in the space between the plates parallel to the cutting slot so that the sheet may be disposed against the guide surface, and the guide bar assembly is moveable in a direction toward and away from the cutting slot to control the width or distance of the cut.

In accordance with one aspect of this invention, the sheet is stationarily mounted and the cutter is fixed to the assembly with the assembly moving across the sheet during the cutting operation.

THE DRAWINGS

FIG. 1 is a top plan view showing the laminate cutting assembly of this invention at different stages of operation;

FIG. 2 is a front elevation view partly in section showing the laminate cutting assembly of this invention;

FIG. 3 is a top plan view of the assembly shown in FIG. 2;

FIG. 4 is an end elevation view partly in section of the laminate cutting assembly of this invention with the clamps in closed position;

FIG. 5 is a view similar to FIG. 4 with the clamps in the open position; and

FIG. 6 is a cross sectional view taken through FIG. 3 along the line 6—6.

DETAILED DESCRIPTION

The laminate cutting assembly 10 of this invention is used for cutting sheets 12 of laminate material such as Formica or the like. It is to be understood, however, that the concepts of this invention may also be used for cutting other types of sheet material. In general, as shown, for example, in FIG. 1, the sheet 12 would be clamped by any suitable clamps 14, 14 so that the sheet is stationary. Ordinarily, the sheet 12 would be placed upon a convenient support surface 16 slightly overhanging therefrom. Assembly 10 would be mounted for movement across sheet 12 in a manner later described and assembly 10 would move across sheet 12 to effect the desired cut in accordance with the predetermined distance or width of the strip of material which is to be cut from sheet 12. FIG. 1 shows assembly 10 in solid lines shortly after the cutting operation has begun and in phantom lines shortly before the cutting operation is completed. The actual cut is designated by the reference letter C.

FIGS. 2–6 show the details of cutting assembly 10. As illustrated therein, cutting assembly 10 includes a lower plate 18 and an upper plate 20 spaced therefrom. The plates include aligned slots 22 through which cutter blade 24 extends. Cutter blade 24 may, for example, be the type of blade used on circular hand saw 26 which in turn is fixedly mounted by bolts or other suitable fasteners 28 to upper plate 20. As best shown in FIGS. 2 and 6, the lead edges 30,32 are rounded to enlarge the opening of the space S between the plates 18, 20 and thus act as camming surfaces to guide sheet 12 as it is inserted into space S. Plates 18, 20 are urged apart from each other by resilient means in the far corners of the plates. FIG. 5 best shows the details of one of these resilient means. As indicated therein, a rod, such as threaded bolt 34, extends through upper plate 20 and is secured to lower plate 18. Spring 36 is mounted around rod 34 in recesses 38, 40 in the upper and lower plates, respectively. Spring 36 urges upper plate 20 upwardly away from lower plate 18.

In accordance with this invention, a guide bar assembly 42 is provided to control the width of the strip being cut from sheet 12. In practice, the width would be, for example, from ¼ to 8 inches. Guide bar assembly 42 is constructed in the manner of a rip fence and includes guide bar or guide surface 44 located in space S parallel to cutting slots 22. As later described, guide surface 44 is moveable toward and away from cutting slots 22 to control the distance of guide surface 44 from cutting slots 22 and thereby control the width of the cut strip at outer edge of which rests against guide surface 44.

Guide bar assembly 42 further includes a pair of aligned oppositely disposed mounts 46 on parallel edges of cutting assembly 10. Each mount 46 includes a lower flange 48 and an upper bifurcated flange 50. Lower plate 18 is supported on lower flanges 48 while upper flanges 50 extend over upper plate 20. As shown in FIGS. 4–6, for example, each bifurcation of upper flange 50 is spanned by pin 52, and a thumb clamp 54 is eccentrically mounted for rotation about pin 52. FIGS. 5 and 6 illustrated the thumb clamps or locking members in the upper or open position where space S is of maximum dimension during the phase of operation where sheet 12 is inserted into space S. After sheet 12 is inserted, thumb clamps 54 are rotated downwardly to the closed position such as illustrated in FIG. 2 to urge upper plate 20 downwardly toward sheet 12. As illustrated in FIGS. 2 and 6, upper plate 20 has mounted thereon a bearing wheel 56 which is so dimensioned that upon the downward movement of upper plate 20, due to the closing manipulation of clamps or lock members 54, bearing wheel 56 is moved into contact with sheet 12 (FIG. 2).

As also illustrated in the various figures, wheels 58 such as swivel mounted casters are secured to and below lower plate 18 for movement over support surface 60. Support surface 60 is located below sheet support surface 16 by a distance corresponding to the height of the portion of assembly 10 located below sheet 12.

During operation of cutting assembly 10 after sheet 12 has been inserted into slot S against guide bar 44, clamps 54 are then closed. Power is turned on for saw 26 and its cutter 24 begins to rotate. Cutter assembly 10 is moved by the operator across sheet 12 to begin the cutting operation. During this movement, casters 58 ride over support surface 60 and bearing wheel 56 rides over and presses against sheet 12 to minimize any vibrations of sheet 12 during the cutting operation. Cutting assembly 10 continues to move across sheet 12 until a strip has been cut from sheet 12.

As previously indicated, guide bar assembly 42 is mounted for movement toward and away from cutting slots 22. Such means of movement is readily apparent from an inspection of the drawings wherein by suitable dimensioning of the components of guide bar assembly 42 with respect to plates 18, 20, the guide bar assembly is moved with the edges of plates 18, 20 acting as a track. If desired, although not illustrated, a groove may be provided parallel to one or both edges of plates 18, 20 with a corresponding pin mounted on the guide bar assembly for movement in the groove to assure that the mounts 46 move parallel to the edges of plates 18, 20. As illustrated in FIG. 3, indicating means such as scale 62 is provided on the upper surface of upper plate 20 to indicate the distance from cutting slots 22 and thereby accurately indicate the width of the cut. If desired, a similar scale or indicating means may also be provided along the opposite side of upper plate 20 to confirm that guide surface 44 is parallel to cutting slots 22. Upper plate 20 also includes a pair of stop pins 64 extending in the path of motion of mounts 46 to limit the distance to which guide bar assembly 42 may be moved toward cutting slots 22.

As previously indicated, bearing roller 55 minimizes and prevents vibrations in sheet 12 thereby avoiding a ragged cut. Bearing roller 56, however, has the added function of supporting the weight of cutter 26 at the end of plate 20 opposite spring 36. FIGS. 4-5 illustrate cutting assembly support surface 60 to be a shoulder below sheet support surface 16. It is to be understood, however, that these support surfaces need not be parts of the same support structure. Thus, for example, sheet support surface 16 may be a bench or other convenient surface and cutting assembly surface 60 may be a floor or bench surface.

Any suitable materials and dimensions may be used in the practice of this invention. Plates 18, 20, for example, may be made of aluminum sheets 12 inches long and 10 inches wide with slots 22 being about 1½ inches inwardly and about 8 inches long. Bearing roller 56 is preferably covered with rubber or other resilient material. Springs 36 are mounted around one inch long bolts 34 and raise upper plate 20 ¼ inch above lower plate 18. Guide bar 44 is 3/16 inch high whereby the clearance between guide bar surface 44 and upper plate 20 is 1/16 inch. This permits free movement of the guide bar assembly to the desired position for the sheet cut width. After the guide bar assembly 42 is positioned for the desired cut width, upper plate 20 is pushed downward 1/16 inch overcoming the action of return springs 36 to cause upper plate 20 to bear against guide bar or guide surface 44. As previously indicated, this downward movement of upper plate 20 is effected by rotating eccentric thumb clamps or lock members 54 to the locked position thereby compressing plates 18, 20 and guide bar assembly 42 securely into place. Further, sheet 12 is also thereby prevented from slipping between the plates 18, 20 and guide bar assembly 42 during cutting. Close tolerance between guide bar assembly 42 and lower plate 18 prevents debris from collecting under guide surface 44.

In the preferred practice of this invention, the sheet cutting elements of cutting assembly 10 are polished to minimize friction therebetween.

As previously indicated, the above description is merely exemplary, and variations may be had therefrom without departing from the spirit of the invention. Thus, for example, in place of a circular saw as a cutting tool, a router may be used. Additionally, the various exemplary dimensions were selected with respect to a laminate such as Formica. The invention, however, may be practiced with other sheet materials and correspondingly different dimensions would be used. With the invention, it is possible to minimize the time required for cutting edges and strips. This time efficiency is particularly significant where a large number of such edgings or strips is required for a job, and the time savings would correspondingly reduce the time required for an entire job.

What is claimed is:

1. Laminate cutting assembly for cutting laminate sheets and the like comprising an upper plate, a lower plate disposed below said upper plate and spaced therefrom whereby the sheet to be cut may be inserted therebetween, an elongated slot in said upper plate and an aligned elongated slot in said lower plate, a cutter extending through said slots for cutting the sheet upon relative movement of the sheet with respect to said cutter, a guide bar assembly having a guide surface located in the space between said upper plate and said lower plate and disposed parallel to said elongated slots whereby the sheet may be disposed in said space and against said guide surface so that the cutter may cut through the sheet at a fixed distance from said guide surface, and said guide bar assembly including means for moving said guide surface toward and away from said slots to control said fixed distance.

2. The assembly of claim 1 including means for moving said upper plate and said lower plate toward each other after the sheet has been inserted therebetween.

3. The assembly of claim 2 including resilient means in said space urging said plates away from each other to facilitate inserting the sheet into said space, and said means for moving said upper plate and said lower plate toward each other comprises lock members urging said upper plate toward said lower plate to overcome the force of said resilient means.

4. The assembly of claim 3 wherein said lock members are mounted to said guide bar assembly.

5. The assembly of claim 4 wherein said resilient means comprises a spring located at each of the two corners of said plates on a side thereof remote from and parallel to said slots, a rod at each of said corners secured to said lower plate and extending through said upper plate, each spring being mounted around a respective one of said rods, said lock members including a pair of rotatable clamps, said guide bar assembly including a pair of spaced aligned bifurcated mounts, the bifurcation of each of said mounts being spanned by a pin, and each of said clamps being eccentrically mounted for rotation on one of said pins.

6. The assembly of claim 1 including pressure bearing means carried by said upper plate from pressing the sheet against said lower plate.

7. The assembly of claim 6 wherein said pressure bearing means comprises a roll rotatably mounted to said upper plate for rolling contact with the sheet.

8. The assembly of claim 1 wherein said cutter is fixedly mounted to said upper plate, and including means for moving said assembly across the sheet whereby the sheet may be stationarily mounted during the cutting operation.

9. The assembly of claim 8 wherein means for moving said assembly includes a plurality of wheels mounted to and below said lower plate.

10. The assembly of claim 9 including a bearing wheel mounted to said upper plate for pressing against the sheet during movement of said assembly.

11. The assembly of claim 10 wherein said plates have a lead edge for receiving the sheet into said space, and said lead edge being rounded.

12. The assembly of claim 1 wherein said guide bar assembly comprises a pair of spaced aligned mounts connected to each other by said guide surface, each of said mounts having a lower flange on which said lower plate is mounted for relative movement therewith, and an upper flange located above and over said upper plate.

13. The assembly of claim 12 wherein distance indicating means is located on said upper plate for indicating the distance of said guide surface from said slots.

14. The assembly of claim 12 wherein each of said upper flanges is bifurcated, a pin spanning each bifurcation, and a clamp eccentrically mounted on each pin for locking said guide bar assembly in place.

15. The assembly of claim 12 including stop means on one of said plates for limiting the movement of said guide bar assembly toward said slots.

16. The assembly of claim 1 including stop means on one of said plates for limiting the movement of said guide bar assembly toward said slots.

17. Laminate cutting assembly for cuting laminate sheets and the like comprising an upper plate, a lower plate disposed below said upper plate and spaced therefrom whereby the sheet to be cut may be inserted therebetween, aligned elongated slots in said upper plate and said lower plate, a cutter fixedly mounted to said upper plate and extending through said slots, means for moving said assembly while the sheet is maintained stationary, and including means for moving said upper plate toward said lower plate after the sheet has been inserted in the space therebetween.

18. The assembly of claim 17 including resilient means in said space urging said plates away from each other to facilitate inserting the sheet into said space, and said means for moving said upper plate and said lower plate toward each other comprises lock members urging said upper plate toward said lower plate to overcome the force of said resilient means.

19. The assembly of claim 18 wherein said resilient means comprises a spring located at each of the two corners of said plates on a side thereof remote from and parallel to said slots, a rod at each of said corners secured to said lower plate and extending through said upper plate, each spring being mounted around a respective one of said rods, said lock members including a pair of rotatable clamps, a pair of spaced aligned bifurcated mounts on said upper plate, the bifurcation of each of said mounts being spanned by a pin, and each of said clamps being eccentrically mounted for rotation on one of said pins.

20. Laminate cutting assembly for cutting laminate sheets and the like comprising an upper plate, a lower plate disposed below said upper plate and spaced therefrom whereby the sheet to be cut may be inserted therebetween, aligned elongated slots in said upper plate and said lower plate, a cutter fixedly mounted to said upper plate and extending through said slots, means for moving said assembly while the sheet is maintained stationary, and including pressure bearing means carried by said upper plate for pressing the sheet against said lower plate.

21. The assembly of claim 20 wherein said pressure bearing means comprises a roll rotatably mounted to said upper plate for rolling contact with the sheet.

22. Laminate cutting assembly for cutting laminate sheets and the like comprising an upper plate, a lower plate disposed below said upper plate and spaced therefrom whereby the sheet to be cut may be inserted therebetween, aligned elongated slots in said upper plate and said lower plate, a cutter fixedly mounted to said upper plate and extending through said slots, means for moving said assembly while the sheet is maintained stationary, and wherein means for moving said assembly includes a plurality of wheels mounted to and below said lower plate.

23. The assembly of claim 22 including a bearing wheel mounted to said upper plate for pressing against the sheet during movement of said assembly.

24. The assembly of claim 23 wherein said plates have a lead edge for receiving the sheet into said space, and said lead edge being rounded.

* * * * *